United States Patent [19]

Miyakawa et al.

[11] Patent Number: 5,133,913
[45] Date of Patent: Jul. 28, 1992

[54] METHOD FOR PRODUCING A FOAMED RESIN USING A BLOWING AND EXTRACTING AGENT

[75] Inventors: Hisashi Miyakawa, Mobara; Takanobu Shinohara, Chiba; Tetsuo Maeda, Urayasu, all of Japan

[73] Assignee: Toyo Engineering Corporation, Tokyo, Japan

[21] Appl. No.: 450,589

[22] Filed: Dec. 13, 1989

[30] Foreign Application Priority Data

Dec. 15, 1988 [JP] Japan .................. 63-315046

[51] Int. Cl.⁵ .................................. B29C 67/22
[52] U.S. Cl. .............................. 264/50; 264/53; 528/483
[58] Field of Search .............. 264/50, 51, 52, 53, 264/54, 55, 45.4, 45.8, DIG. 10; 528/483

[56] References Cited

U.S. PATENT DOCUMENTS

| | | | |
|---|---|---|---|
| 2,194,036 | 3/1940 | Talalay | 264/101 |
| 2,531,665 | 11/1950 | Booth | 264/50 |
| 3,150,214 | 9/1964 | Scalora et al. | 264/55 |
| 3,184,419 | 5/1965 | Merriman | 264/53 |
| 3,243,485 | 3/1966 | Griffin | 264/45.4 |
| 3,600,483 | 8/1971 | Davis et al. | 264/205 |
| 4,120,923 | 10/1978 | Kloker et al. | 264/50 |
| 4,205,149 | 5/1980 | Cich et al. | 526/89 |
| 4,526,907 | 7/1985 | Thiala et al. | 222/57 |
| 4,695,621 | 9/1987 | Allada | 528/483 |
| 4,703,105 | 10/1987 | Allada | 528/483 |
| 4,810,570 | 3/1989 | Ruttan et al. | 264/53 |
| 4,906,672 | 3/1990 | Stone et al. | 264/50 |
| 4,911,869 | 3/1990 | Mayer et al. | 264/50 |
| 5,049,328 | 9/1991 | Meyer et al. | 264/50 |

FOREIGN PATENT DOCUMENTS

| | | |
|---|---|---|
| 0113903 | 7/1984 | European Pat. Off. |
| 3323940 | 1/1985 | Fed. Rep. of Germany |
| 1332201 | 6/1963 | France |

*Primary Examiner*—Jay H. Woo
*Assistant Examiner*—Robert B. Davis
*Attorney, Agent, or Firm*—Flynn, Thiel, Boutell & Tanis

[57] ABSTRACT

There is disclosed a method for producing a foamed resin which incolves the steps of removing volatile substances from a polymer by contacting the polymer with an extractant and foaming the purified polymer by using the same extractant dissolved in the polymer as a foaming agent. According to the disclosure the purification and blowing of a polymer can be carried out efficiently and economically with a purification sufficient to meet market demand and with a desired blowing expansion rate.

20 Claims, 1 Drawing Sheet

METHOD FOR PRODUCING A FOAMED RESIN USING A BLOWING AND EXTRACTING AGENT

FIELD OF THE INVENTION

This invention relates to a method for producing a foamed resin (or a foamed plastics) and removing volatile substances from a polymer.

BACKGROUND OF THE INVENTION

In the production of foamed resins in the prior art, a method is known of producing a foamed resin by an extruder using a polymer (for example, in the case of polystyrenes, the concentration of volatile substances, such as the remaining unreacted monomer and solvents, is approximately on the order of 3,000 to 400 ppm), and kneading the polymer with, as a blowing agent, a hydrocarbon such as propane, butane, and pentane, or a halogenated hydrocarbon such as trichlorofluoromethane.

On the other hand, in polymer resins and polymer foamed products, the demand for lowering the level of the concentration of remaining volatile substances has become severe, and it is desired that their concentration be reduced to about 100 ppm or less.

However, in the above prior method for the production of foamed resins, volatile substances, such as the unreacted monomer and solvents remaining in the polymer that is used in the production of a foam, can hardly be reduced to a level lower than a limit of approximately 400 ppm during conventional steps of producing the polymer. Thus, the molded or foamed product obtained from such a polymer has difficulty in meeting the market demand that the concentration of the residual volatile substances be not more than the above mentioned value. Further, in the prior art methods since the steps in the production of a foamed resin are carried out independent of the removal of volatile substances from the polymer (i.e., purification of the polymer), the steps involved in making the foam into a final product become complicated, and the prior art method has a problem in view of economy, such as the required energy.

BRIEF SUMMARY OF THE INVENTION

Therefore, the first object of the present invention is to provide a method for producing a foamed resin wherein a polymer is purified and foamed effectively and economically by an integrated process.

The second object of the present invention is to provide a method for producing a foamed resin economically wherein volatile substances remaining in a polymer, such as the unreacted monomer and solvents, are removed to such an extent that the concentration of the volatile substances can meet strict market demand.

The third object of the present invention is to provide an economical method for obtaining a foamed and molded article, whose impurity concentration is very low, with the expansion rate being arbitrary.

Other and further objects, features, and advantages of the invention will appear more fully from the following detailed description and drawing.

DETAILED DESCRIPTION OF THE INVENTION

Figure 1:
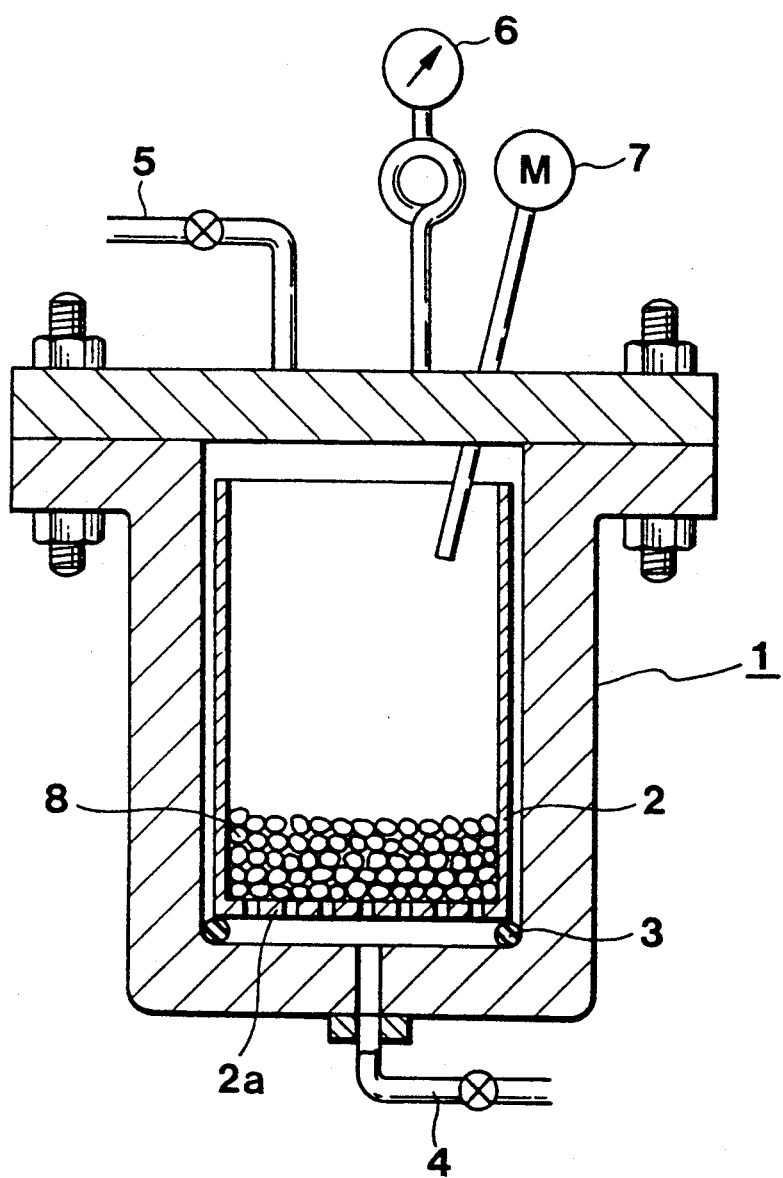
FIG. 1 is a sectional view of an extractor for use in a preferred embodiment of the present invention.

The inventors have studied intensively to overcome the problems described above in the prior art methods of producing a foam, and have found a method of obtaining a foamed resin from a polymer, the concentration of volatile substances of which is low, by bringing a polymer in contact with an extractant for removing volatile substances in the polymer, and thereafter using as a blowing agent the same extractant dissolved in the polymer that was used for the removal of the volatile substances, so that the removal of the volatile substances and the foaming may be effected efficiently, and the concentration of the volatile substances remaining in the polymer may be reduced to approximately 100 ppm or below, which has led to the present invention.

That is, the present invention provides a method for producing a foamed resin that comprises bringing a polymer in contact with an extractant under pressure to remove volatile substances remaining in the polymer, and then using that same extractant dissolved in the polymer as a blowing agent for the foaming (expansion) operation. One of the features of the present invention is that the extractant remaining in the polymer after extraction is utilized as a blowing agent under a lower pressure condition than the extraction operation.

Preferable polymers in the practice of the present method are thermoplastic polymers that will melt by heating but will be solid at room temperature, for example, polyethylene, polypropylene, polystyrene, acrylonitrile/styrene copolymer, acrylonitrile/butadiene/styrene terpolymer, polyvinyl acetate, polyacrylate, polymethacrylate, polyvinyl chloride, polyvinylidene chloride, fluorocarbon polymers, polyacrylonitrile, polyvinyl ether, polyvinyl ketone, polyethers, thermoplastic polyesters, polyamides, styrene/butadiene polymers, diene polymers, polyurethane polymers, urea polymers, phenol polymers, polyxylylene, polycarbonate, polyphenylene oxide, and polysulfone. In particular, preference is given to a polystyrene polymer that is in the form of a powder, beads, or pellets wherein the concentration of residual volatile substances is 400 ppm or over, or a liquid or melt composition containing polystyrene polymer wherein the concentration of residual volatile substances is 3,000 to 5,000 ppm.

Although the extractant (which also is a blowing agent) used in the present invention may be selected suitably for the polymer that will be subjected to extraction and foaming, as specific examples of the extractant, (a) carbon dioxide, dinitrogen oxide, carbon disulfide, aliphatic hydrocarbons, (i.e., ethane, ethylene, propane, butane, pentane, and hexane), halogenated hydrocarbons, aromatic hydrocarbons (i.e., benzene, toluene, and xylene), and alcohols, (i.e., methanol and ethanol), and (b) a mixture of two or more of these, can be mentioned. For reference, critical constants, etc. of the mentioned typical extractants are shown in Table 1.

TABLE 1

| Substance | Critical Constants | | Boiling Point b.p. (°C.) |
| --- | --- | --- | --- |
| | Critical Temperature Tc (°C.) | Critical Pressure Pc (atm) | |
| Carbon dioxide | 31.1 | 73.0 | −78.5* |
| Dinitrogen oxide | 36.5 | 71.7 | −90.7 |
| Carbon disulfide | 273.0 | 76.0 | 46.3 |
| Ethane | 32.4 | 48.3 | −88.6 |
| Ethylene | 9.7 | 50.5 | −103.9 |

TABLE 1-continued

| Substance | Critical Constants | | |
|---|---|---|---|
| | Critical Temperature Tc (°C.) | Critical Pressure Pc (atm) | Boiling Point b.p. (°C.) |
| Propane | 96.8 | 42.0 | −42.1 |
| Butane | 152.0 | 37.5 | −0.5 |
| Pentane | 196.6 | 33.3 | 36.1 |
| Hexane | 234.7 | 29.9 | 68.7 |
| Benzene | 288.5 | 47.7 | 80.1 |
| Toluene | 320.6 | 41.6 | 110.8 |
| o-Xylene | 358.4 | 36.9 | 144 |
| Methanol | 240.0 | 78.7 | 64.6 |
| Ethanol | 243.1 | 63.1 | 78.4 |

Note:
*sublimation

In the present invention, preferably the extractant in the extraction operation is used in a supercritical state or in a sub-critical state, more preferably, a supercritical state. Although the pressure and temperature in the extractor may vary depending on the type of polymer to be purified and the type of extractant to be used, generally the pressure is preferably 20 to 500 kg/cm$^2$G, more preferably 40 to 350 kg/cm$^2$G, and the temperature is preferably at or over the melting point of the polymer to be purified. In this case, although the temperature in the extractor may be at or over the melting point of the polymer and below the critical temperature of the extractant, more preferably, the temperature in the extractor is at or over the critical temperature of the extractant. If the pressure is too low, the extraction ability of the extractant for volatile substances remaining in the polymer becomes low, and sometimes an adequate extractability cannot be secured. If the pressure is too high, great improvement of the extractability cannot be expected, making the cost of the apparatus and the energy required for compressing the extractant increase, which is not economical.

Volatile substances that are the object of the extraction in the present invention are volatile impurities contained in the polymers mentioned above, such as unreacted monomer, solvents, and oligomers.

In the practice of the present invention, the extractor to be used is preferably a tank-type extractor, and, although, for example, a packed tower-type, tray tower-type, or spray tower-type extractor is suitable, there is no particular limitation if the extractor is one wherein there is good contact between the polymer to be subjected to extraction and the extractant. Plural extractors may be arranged in parallel to carry out the extraction continually, or they may be arranged in series, thereby flowing the polymer and the extractant, for example, in a countercurrent manner, to effect extraction continuously. The extraction operation is carried out in the usual manner, except for the above points.

In the present invention, the foaming (expansion) operation is carried out following the extraction operation. That is, the foaming operation is carried out by the expanding action due to the volatilization of extractant which has dissolved in the polymer during the extraction operation. Thus, the dissolved extractant serves as a blowing agent. The density of the foam produced is determined suitably and is adjusted by controlling the amount of extractant (blowing agent) dissolved in the polymer.

In the present invention, the above extractor may be used for the foaming operation, or a storage foaming tank may be separately provided for the foaming operation.

If the extractor is used also for the foaming operation following the extraction, a mold for foaming is previously placed in the extractor before the extraction operation, and the extraction and the foaming operation may be carried out with the mold filled with the polymer. FIG. 1 shows an example of an extractor for carrying out the above-mentioned method of the invention. In FIG. 1, reference numeral 1 indicates an extractor (for example, an autoclave) provided with a foaming mold 2 having a cylindrical shape with a perforated bottom plate 2a. Foaming mold 2 is removable and exchangeable. The extractor 1 is provided with an inlet pipe 4, outlet pipe 5 of the gas, an pressure gauge 6 and a thermometer 7. Reference numeral 3 indicates an O-ring for sealing. The shape of foaming mold 2 may be selected arbitrarily in accordance with the inner shape of the extractor or the desired shape of the foamed products. In operation, foaming mold 2 is charged with polymer 8 to be purified and foamed, in the form of a powder, beads, pellets, liquid, or the like, and then extractant is continuously supplied from the bottom of extractor 1 through pipe 4. The extractant goes up through the holes of perforated bottom plate 2a of mold 2 to be in contact with polymer 8 and to elevate the pressure in extractor 1. At the same time, the temperature in extractor 1 is elevated by an external heater (not shown). After the temperature and the pressure in extractor 1 reach desired levels and are maintained for the prescribed time interval for extraction, the supply of extractant and the heating are stopped, and then the pressure in the extractor 1 is lowered to a pressure for foaming (usually an ordinary pressure) by relieving gas at a foaming temperature through pipe 5 for foaming and molding. Then, the temperature is lowered to an ordinary temperature and the foam obtained is removed from foaming mold 2. In this embodiment, it is advantageous that foaming mold 2 need not to be pressure-resistant because of the use of pressure-resistant extractor 1.

On the other hand, if the foaming operation is carried out using a storage tank, the polymer having the extractant dissolved therein is taken out from the extractor, and is supplied into a storage tank. In the storage tank, the only requirement is that the pressure and the temperature are suitably controlled within the range of the above extraction conditions so that a desirable expansion rate may be obtained. That is, by controlling the pressure and the temperature, the amount of the extractant dissolved in the polymer can be controlled. The storage tank may be provided with a blow nozzle having a prescribed shape for blowing and molding, through which, the polymer in a melted state may be spouted out to a mold to allow the polymer to be foamed and molded continuously. This blowing and molding step using a blow nozzle itself may be carried out by a usual manner.

The amount of extractant dissolved (remained) in the polymer and used as a blowing agent is an equilibrium amount under the pressure and temperature after the extraction.

The foaming temperature usually depends on the melting point of the polymer used, and is in a range of 60° to 400° C., preferably 100° to 200° C., and may be the same as that in extraction, and the pressure condition is preferably 5 to 500 kg/cm$^2$G, more preferably 10 to 250 kg/cm$^2$G.

By suitable expansion molding, the foam may be formed into a desired shape, for example, into a sheet, plate, prism, or tube. The foaming operation can be carried out in a usual manner, except for the above-described points. During foaming, in order to obtain a characteristic foam meeting the market demand, a blowing auxiliary, such as sodium bicarbonate, and other additives may be used optionally in combination.

According to the method of the present invention, the purification and foaming of a polymer can be carried out effectively and economically. In this invention, an extraction step and a foaming step can be effected integrally, so that a foam, in which the volatile impurity substances have been highly extracted, can be obtained. Therefore, the molded and foamed article is much lower in its content of impurities. The article can meet the market demand that severely restricts the concentration of residual volatile substances. Further, according to the method of the present invention, by controlling the amount of the extractant dissolved in the polymer in the foaming operation, a foam having an arbitrary expansion rate can be easily obtained. The expansion rate of foams produced by the method of the present invention is usually 2 to 1000, which represents, for example, 600 to 10 kg/m$^3$ in density, with there being some deviations between polymers used. Still further, according to the present invention, an extruder is not required. Furthermore, since the remaining pressure in the extraction step can be utilized, additional pressurizing in the foaming step becomes unnecessary and is economically advantageous.

The present invention will now be described in detail with reference to Examples.

EXAMPLE 1

An extractor as shown in FIG. 1 was used. 20 g of polystyrene 8 in the form of pellets, the concentration of volatile substances of which was 450 ppm, was filled into a foaming mold 2 (having a volume of 190 cm$^3$ with a diameter of 5.5 cm and a height of 8 cm), then carbon dioxide was continuously supplied from the bottom of the extractor 1 through pipe 4 at a rate of 80 g/min, and the temperature and pressure in the extractor 1 were elevated. After the temperature and the pressure in the extractor 1 were kept at 150° C. and 250 kg/cm$^2$G respectively for one hour, the supply of carbon dioxide and the heating were stopped, and then the pressure in the mold was lowered to ordinary pressure by gas relief through pipe 5. During that, the temperature in the mold was kept at 110° C. Thereafter, the temperature was lowered to an ordinary temperature (30° C.). Thus, a pure white foamed and molded article having an expansion rate of about 20 was obtained in the mold. As a result of analysis, it was found that the concentration of volatile substances of the foamed and molded article was 50 ppm.

EXAMPLE 2

20 g of polystyrene in a powdery form, the concentration of volatile substances of which was 2,200 ppm, was filled into an extractor (having a volume of 190 cm$^3$, a diameter of 5.5 cm and a height of 8 cm), then carbon dioxide was continuously supplied from the bottom of the extractor at a rate of 40 g/min, and the temperature and the pressure in the extractor were elevated. After the temperature and the pressure in the extractor were maintained at 150° C. and 250 kg/cm$^2$G respectively for two hours, the supply of carbon dioxide and the heating were stopped, and the polystyrene was supplied into a storage tank, wherein the temperature was 120° C. and the pressure was 150 kg/cm$^2$G. Then the polystyrene was spouted from the blow nozzle at the bottom section of the storage tank, to obtain a foam. The foam had an expansion rate of about 10. As a result of analysis, it was found that the concentration of volatile substances of the foam was 15 ppm.

COMPARATIVE EXAMPLE

The same polystyrene sample as in Example 1 was used to produce a foam by a 2-stage extruder system. In the first extruder, polystyrene pellets were heated up to 250° C. to melt, then dichlorodifluoromethane (R-12) was injected into the melted polystyrene and mixed uniformly therewith. Thereafter, the mixture was fed to the second extruder, cooled to 150° C., and extruded through a dye to give a foam. The concentration of residual volatile substances in the thus-obtained foam was 410 ppm.

Having described our invention as related to the embodiment, it is our intention not that the invention be limited by any of the details of the description, unless otherwise specified, but rather be construed broadly within its spirit and scope as set out in the accompanying claims.

What we claim is:

1. In a method for producing a foamed polymer, the improvement comprising contacting a molten ppolymer containing volatile components with a flowing extractant for said volatile components in an extractor at a pressure and temperature sufficient to remove said volatile components from said molten polymer and dissolve said extractant therein and conducting foam molding with said polymer having said extractant dissolved therein under conditions such that said dissolved extractant serves as a blowing agent for said polymer and causes said polymer to foam.

2. The method as claimed in claim 1, wherein the extractant is in a supercritical state.

3. The method as claimed in claim 1, wherein the extractant in the extraction operation is used in the sub-critical state.

4. The method as claimed in claim 1, wherein the polymer is a thermoplastic polymer selected from the group consisting of polyethylene, polypropylene, polystyrene, acrylonitrile/styrene copolymer, acrylonitrile/butadiene/styrene terpolymer, polyvinyl acetate, polyacrylate, polymethacrylate, polyvinyl chloride, polyvinylidene chloride, fluorocarbon polymers, polyacrylonitrile, polyvinyl ether, polyvinyl ketone, polyethers, thermoplastic polyesters, polyamides, styrene/butadiene polymers, diene polymers, polyurethane polymers, urea polymers, phenol polymers, polyxylylene, polycarbonate, polyphenylene oxide, and polysulfone.

5. The method as claimed in claim 1, wherein the molten polymer comprises a polystyrene polymer.

6. The method as claimed in claim 1, wherein the extractant is selected from the group consisting of carbon dioxide, dinitrogen oxide, carbon disulfide, an aliphatic hydrocarbon, a halogenated hydrocarbon, an aromatic hydrocarbon, and mixtures thereof.

7. The method as claimed in claim 1, wherein said pressure is in a range of 20 to 500 kg/cm$^2$G.

8. The method as claimed in claim 1, wherein said temperature is at least as high as the melting point of the polymer.

9. The method as claimed in claim 1, wherein the volatile components to be removed is an impurity selected from the group consisting of an unreacted monomer, a solvent and an oligomer.

10. The method as claimed in claim 1, wherein the extractor is a tank-type extractor.

11. The method as claimed in claim 1, wherein the extractor is a packed tower-type, a tray tower-type or a spray tower-type extractor.

12. The method as claimed in claim 1, wherein said contacting of said molten polymer with said extractant occurs in plural extractors arranged in parallel.

13. The method as claimed in claim 1, wherein said contacting of said molten polymer with said extractant occurs in plural extractors arranged in series.

14. The method as claimed in claim 1, wherein said foam molding is carried out in the extractor.

15. The method as claimed in claim 1, wherein a mold for foaming is previously placed in the extractor before said molten polymer is contacted with said extractant.

16. The method as claimed in claim 1, wherein said foam molding is carried out in a storage tank in which the polymer containing the extractant is supplied from the extractor.

17. The method as claimed in claim 16, wherein the polymer in a melted state is spouted out of a blow nozzle provided on said storage tank during said foam molding.

18. A method for producing a foamed polymer from a molten polymer having a volatile impurity level of at least 400 ppm, said method comprising the steps of contacting said molten polymer with a flowing extractant for said volatile impurity in an extractor at a temperature and pressure sufficient to lower said volatile impurity level in said polymer to no higher than 100 ppm and dissolve said extractant therein; stopping the contact of said polymer with said flowing extractant; and reducing said pressure on said polymer such that said dissolved extractant serves as a blowing agent for said polymer and causes said polymer to foam.

19. The method as claimed in claim 18, wherein said extractant is in a supercritical state.

20. The method as claimed in claim 18, wherein said polymer is polystyrene.

* * * * *

UNITED STATES PATENT AND TRADEMARK OFFICE
CERTIFICATE OF CORRECTION

PATENT NO. : 5 133 913
DATED : July 28, 1992
INVENTOR(S) : Hisashi MIYAKAWA et al It is certified that error appears in the above-identified patent and that said Letters Patent is hereby corrected as shown below:

Column 6, line 29; change "ppolymer" to ---polymer---.

Column 7, line 43; delete "in the extraction operation".
line 43; delete "used".
line 43; change "the" (last occurrence) to ---a---.

Column 7, line 8; change "or" to ---and---.

Signed and Sealed this

Eighteenth Day of January, 1994

*Attest:*

BRUCE LEHMAN

*Attesting Officer*  Commissioner of Patents and Trademarks